(12) United States Patent
Yuasa (10) Patent No.: US 11,629,959 B2
(45) Date of Patent: Apr. 18, 2023

(54) SURVEYING INSTRUMENT

(71) Applicant: TOPCON Corporation, Tokyo-to (JP)

(72) Inventor: Taichi Yuasa, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 319 days.

(21) Appl. No.: 16/944,252

(22) Filed: Jul. 31, 2020

(65) Prior Publication Data

US 2021/0041237 A1 Feb. 11, 2021

(30) Foreign Application Priority Data

Aug. 6, 2019 (JP) .............................. JP2019-144165

(51) Int. Cl.
| | | |
|---|---|---|
| *G01C 15/00* | (2006.01) | |
| *G01C 3/00* | (2006.01) | |
| *G01C 15/06* | (2006.01) | |

(52) U.S. Cl.
CPC .............. *G01C 15/006* (2013.01); *G01C 3/00* (2013.01); *G01C 15/06* (2013.01)

(58) Field of Classification Search
CPC ........ G01C 15/006; G01C 3/00; G01C 15/06; G01C 15/002; G01S 7/4816; G01S 7/4817; G01S 7/497; G01S 17/42
USPC ....................................................... 356/4.08
See application file for complete search history.

(56) References Cited

U.S. PATENT DOCUMENTS

| | | |
|---|---|---|
| 5,949,530 A | 9/1999 | Wetteborn |
| 2012/0055035 A1 | 3/2012 | Litvin et al. |
| 2015/0092181 A1 | 4/2015 | Nishita |
| 2015/0370077 A1 | 12/2015 | Zuo et al. |
| 2019/0064326 A1 | 2/2019 | Tanaka et al. |
| 2019/0094341 A1 | 3/2019 | Ishinabe et al. |

FOREIGN PATENT DOCUMENTS

JP 10-20035 A 1/1998

OTHER PUBLICATIONS

European communication dated Jan. 14, 2021 in corresponding European patent application No. 20189697.4.

*Primary Examiner* — Daniel L Murphy
(74) *Attorney, Agent, or Firm* — Nields, Lemack & Frame, LLC (57) ABSTRACT

A surveying instrument includes a distance measuring module for measuring a distance to the object, in which the distance measuring module includes a light projecting optical system configured to project a distance measuring light and a light receiving optical system configured to receive a reflected distance measuring light, the light receiving optical system includes a prism having a quadrangular shape and a photodetector, the prism includes a first plane, a second plane, a third plate and a fourth plane, configured to enter the reflected distance measuring light in the first plane, sequentially internally reflect on the second plane, the first plane, and the third plane, transmit through the fourth plane, and project, and the reflect distance measuring light projected from the prism configured to be received by the photodetector.

13 Claims, 8 Drawing Sheets

| PRISM REFRACTIVE INDEX | NA OF OPTICAL SYSTEM | PRISM CHIEF RAY INCIDENCE ANGLE [°] | | | |
|---|---|---|---|---|---|
| | | $\theta_1$ | $\theta_2$ | $\theta_1'$ (=2$\theta_2$) | $\theta_3$ | $\theta_4$ |
| 1.421695 | 0.250 | 0.00 | 30.00 | 60.00 | 10.00 | 0.00 |
| 1.500264 | 0.154 | 0.00 | 24.00 | 48.00 | 18.20 | 0.00 |
| 1.683128 | 0.308 | 0.00 | 23.50 | 47.00 | 16.90 | 0.00 |
| 1.683128 | 0.154 | 0.00 | 21.00 | 42.00 | 18.00 | 0.00 |
| 1.743626 | 0.308 | 0.00 | 22.50 | 45.00 | 17.95 | 0.00 |
| 2.103763 | 0.550 | 0.00 | 21.00 | 42.00 | 18.50 | 0.00 |
| 2.103763 | 0.050 | 0.00 | 15.00 | 30.00 | 30.00 | 0.00 |

| PRISM REFRACTIVE INDEX | NA OF OPTICAL SYSTEM | PRISM CHIEF RAY INCIDENCE ANGLE [°] | | | | | |
|---|---|---|---|---|---|---|---|
| | | $\theta_1$ | $\theta_2$ | $\theta_1{'}\ (=2\theta_2)$ | $\theta_3$ | $\theta_4(=1.5\theta_2+\theta_3)$ | $\theta_2{'}$ |
| 1.421695 | 0.250 | 0.00 | 30.00 | 60.00 | 10.00 | 55.00 | 0.00 |
| 1.500264 | 0.154 | 0.00 | 24.00 | 48.00 | 18.20 | 54.20 | 0.00 |
| 1.683128 | 0.308 | 0.00 | 23.50 | 47.00 | 16.90 | 52.15 | 0.00 |
| 1.683128 | 0.154 | 0.00 | 21.00 | 42.00 | 18.00 | 49.50 | 0.00 |
| 1.743626 | 0.308 | 0.00 | 22.50 | 45.00 | 17.95 | 51.70 | 0.00 |
| 2.103763 | 0.550 | 0.00 | 21.00 | 42.00 | 18.50 | 50.00 | 0.00 |
| 2.103763 | 0.050 | 0.00 | 15.00 | 30.00 | 30.00 | 52.50 | 0.00 |

SURVEYING INSTRUMENT

BACKGROUND OF THE INVENTION

The present invention relates to a surveying instrument which can acquire the three-dimensional coordinates of an object.

A surveying instrument such as a laser scanner or a total station has an electronic distance measuring device which detects a distance to an object which is to be measured by the prism distance measurement using a reflecting prism as the object or the non-prism distance measurement using no reflecting prism.

A light receiving module of the electronic distance measuring device has an optical system including a lens, and the incoming light is imaged on a light receiving surface by a refracting effect of the lens. An objective lens of the optical system has a focal distance "f", and this focal distance "f" is determined by the performance required for the electronic distance measuring device.

For this reason, the light receiving module of the electronic distance measuring device requires a size which enables accommodating the optical system and a length in an optical axis direction which enables accommodating the focal distance "f". Therefore, the miniaturization of the light receiving module has been difficult due to the limitation in the size of the optical system and the focal distance.

SUMMARY OF INVENTION

It is an object of the present invention to provide a surveying instrument which miniaturizes an optical system and attains the miniaturization of the entire instrument.

To attain the object as desired, a surveying instrument according to the present invention includes a distance measuring module for irradiating an object with the distance measuring light and measuring a distance to the object based on the reflected distance measuring light from the object, wherein the distance measuring module includes a light projecting optical system configured to project the distance measuring light and a light receiving optical system configured to receive the reflected distance measuring light, the light receiving optical system includes a prism having a quadrangular shape and a photodetector, the prism comprises a first plane, a second plane, a third plate and a fourth plane, configured to enter the reflected distance measuring light in the first plane, sequentially internally reflect on the second plane, the first plane, and the third plane, transmit through the fourth plane, and project, and the reflected distance measuring light projected from the prism configured to be received by the photodetector.

Further, a surveying instrument according to the present invention includes a distance measuring module for irradiating an object with the distance measuring light and measuring a distance to the object based on the reflected distance measuring light from the object, wherein the distance measuring module includes a light projecting optical system configured to project the distance measuring light and a light receiving optical system configured to receive the reflected distance measuring light, the light receiving optical system includes a prism having a quadrangular shape and a photodetector, the prism comprises a first plane, a second plane, a third plate, and a fourth plane, the second plane is constituted of a reflection plane for reflecting the reflected distance measuring light and a transmission plane for transmitting through the reflected distance measuring light, the prism configured to enter the reflected distance measuring light in the first plane, sequentially internally reflect on the reflection plane, the first plane, the third plane, and the fourth plane, transmit through the transmission plane, and project, and the reflected distance measuring light projected from the prism configured to be received by the photodetector.

Further, in the surveying instrument according to a preferred embodiment, the prism is configured in such a manner that a chief ray incidence angle "θ1" of the reflected distance measuring light with respect to the first plane and a chief ray incidence angle "θ4" of the reflected distance measuring light with respect to the fourth plane become 0°, respectively.

Further, in the surveying instrument according to a preferred embodiment, the prism is configured in such a manner that a chief ray incidence angle "θ1" of the reflected distance measuring light with respect to the first plane and a chief ray incidence angle "θ2'" of the reflected distance measuring light with respect to the transmission plane become 0°, respectively.

Further, in the surveying instrument according to a preferred embodiment, the prism is configured in such a manner that a chief ray incidence angle "θ2" of the reflected distance measuring light with respect to the second plane falls within the range of 15° to 30°, a chief ray incidence angle "θ1'" of the reflected distance measuring light reflected on the second plane with respect to the first plane becomes "2θ2", and a chief ray incidence angle "θ3" of the reflected distance measuring light with respect to the third plane falls within the range of 10° to 30°.

Further, in the surveying instrument according to a preferred embodiment, the prism is configured in such a manner that a chief ray incidence angle "θ2" of the reflected distance measuring light with respect to the second plane falls within the range of 15° to 30°, a chief ray incidence angle "θ1" of the reflected distance measuring light reflected on the second plane with respect to the first plane becomes "2θ2", a chief ray incidence angle "θ3" of the reflected distance measuring light with respect to the third plane falls within the range of 10° to 30°, and a chief ray incidence angle "θ4" of the reflected distance measuring light with respect to the fourth plane becomes "1.5θ2+θ3".

Further, in the surveying instrument according to a preferred embodiment, the light receiving optical system includes a light receiving lens for collecting the reflected distance measuring light, and an NA (Numerical Aperture) of the light receiving lens falls within the range of 0.05 to 0.55.

Furthermore, in the surveying instrument according to a preferred embodiment, the structure chamfering processing is performed with respect to a ridge portion formed by the second plane and the third plane.

According to the present invention, the surveying instrument includes a distance measuring module for irradiating an object with the distance measuring light and measuring a distance to the object based on the reflected distance measuring light from the object, wherein the distance measuring module includes a light projecting optical system configured to project the distance measuring light and a light receiving optical system configured to receive the reflected distance measuring light, the light receiving optical system includes a prism having a quadrangular shape and a photodetector, the prism comprises a first plane, a second plane, a third plate and a fourth plane, configured to enter the reflected distance measuring light in the first plane, sequentially internally reflect on the second plane, the first plane, and the third plane, transmit through the fourth plane, and project, and the reflected distance measuring light projected from the prism configured to be received by the photodetector. As a result, a length in the optical axis direction can be shortened, and the miniaturization of the optical system and the miniaturization of the entire instrument can be achieved.

Further, according to the present invention, the surveying instrument includes a distance measuring module for irradiating an object with the distance measuring light and measuring a distance to the object based on the reflected distance measuring light from the object, wherein the distance measuring module includes a light projecting optical system configured to project the distance measuring light and a light receiving optical system configured to receive the reflected distance measuring light, the light receiving optical system includes a prism having a quadrangular shape and a photodetector, the prism comprises a first plane, a second plane, a third plate, and a fourth plane, the second plane is constituted of a reflection plane for reflecting the reflected distance measuring light and a transmission plane for transmitting through the reflected distance measuring light, the prism configured to enter the reflected distance measuring light in the first plane, sequentially internally reflect on the reflection plane, the first plane, the third plane, and the fourth plane, transmit through the transmission plane, and project, and the reflected distance measuring light projected from the prism configured to be received by the photodetector. As a result, a length in the optical axis direction can be shortened, and the miniaturization of the optical system and the miniaturization of the entire instrument can be achieved.

DETAILED DESCRIPTION OF THE PREFERRED EMBODIMENTS

A description will be given on an embodiment of the present invention by referring to the attached drawings.

Figure 1:
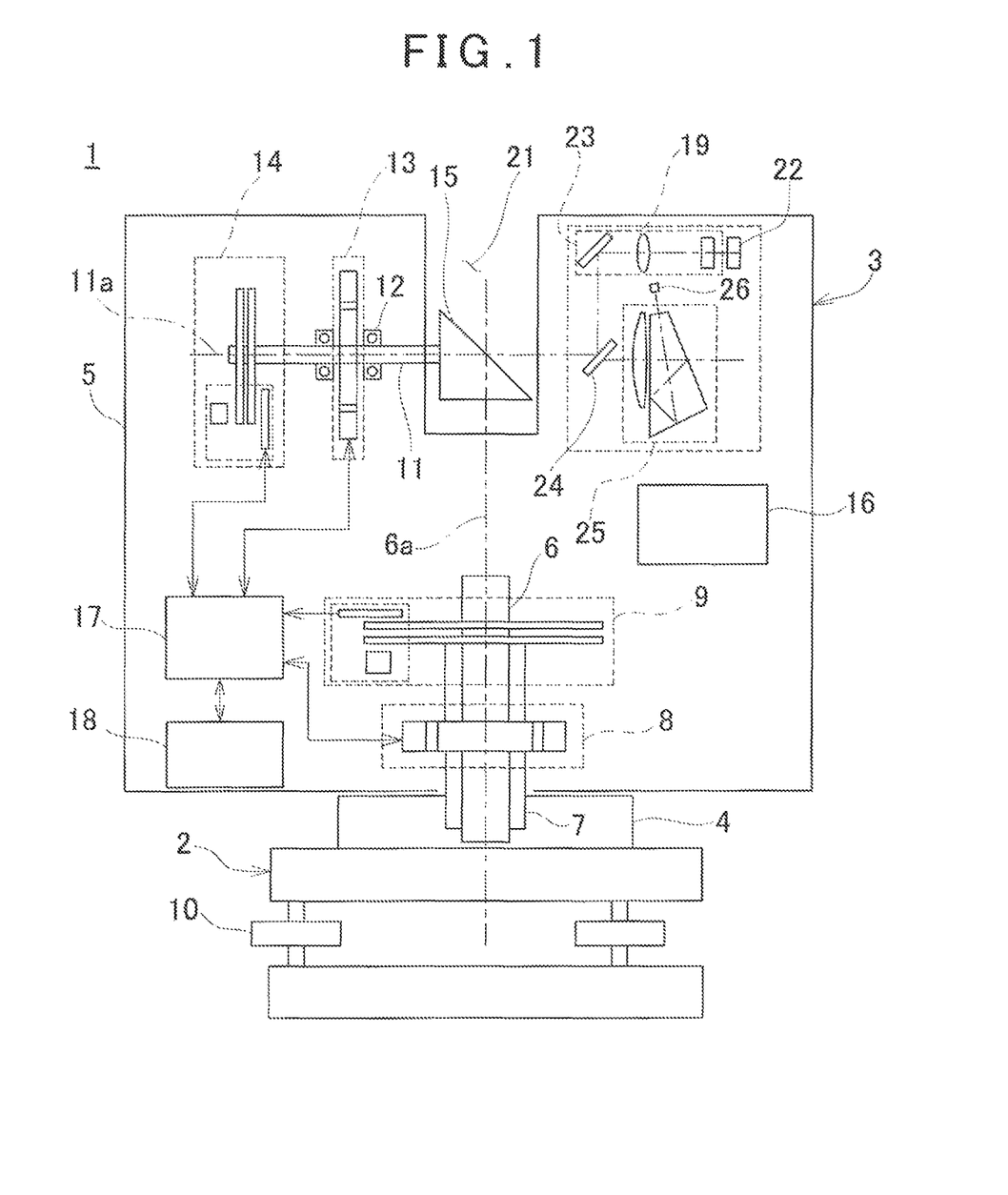
FIG. 1 is a front sectional view showing a surveying instrument according to a first embodiment of the present invention.

First, in FIG. 1, a description will be given on a surveying instrument according to a first embodiment of the present invention.

A surveying instrument 1 is, for instance, a laser scanner, and constituted of a leveling unit 2 mounted on a tripod (not shown) and a surveying instrument main body 3 mounted on the leveling unit 2. It is to be noted that, as the measurement, the non-prism measurement is carried out.

The leveling unit 2 has the leveling screws 10, and the surveying instrument main body 3 is leveled up by the leveling screws 10.

The surveying instrument main body 3 includes a fixing unit 4, a frame unit 5, a horizontal rotation shaft 6, a horizontal rotation bearing 7, a horizontal rotation motor 8 as a horizontal rotation driving module, a horizontal angle encoder 9 as a horizontal angle detector, a vertical rotation shaft 11, a vertical rotation bearing 12, a vertical rotation motor 13 as a vertical rotation driving module, a vertical angle encoder 14 as a vertical angle detector, a scanning mirror 15 which is a vertical rotation module, an operation panel 16 which serves as both an operation module and a display module, an arithmetic control module 17, a storage module 18, a distance measuring module 19 and others. It is to be noted that, as the arithmetic control module 17, a CPU specialized for this instrument or a general-purpose CPU is used.

The horizontal rotation bearing 7 is fixed to the fixing unit 4. The horizontal rotation shaft 6 has a vertical axis 6a and the horizontal rotation shaft 6 is rotatably supported by the horizontal rotation bearing 7. Further, the frame unit 5 is supported by the horizontal rotation shaft 6 and the frame unit 5 integrally rotates with the horizontal rotation shaft 6 in the horizontal direction.

The horizontal rotation motor 6 is provided between the horizontal rotation bearing 7 and the frame unit 5, and the horizontal rotation motor 8 is controlled by the arithmetic control module 17. The arithmetic control module 17 rotates the frame unit 5 around the axis 6a by the horizontal rotation motor 8.

A relative rotation angle of the frame unit 5 to the fixing unit 4 is detected by the horizontal angle encoder 9. A detection signal from the horizontal angle encoder 9 is input to the arithmetic control module 17, and the horizontal angle data is calculated by the arithmetic control module 17. The arithmetic control module 17 performs the feedback control of the horizontal rotation motor 8 based on the horizontal angle data.

Further, in the frame unit 5, the vertical rotation shaft 11 having a horizontal axis 11a is provided. The vertical rotation shaft 11 can rotate via the vertical rotation bearing 12. It is to be noted that an intersection of the axis 6a and the axis 11a is a projecting position for the distance measuring light, and the intersection is an origin of a coordinate system of the surveying instrument main body 3.

A recess portion 21 is formed in the frame unit 5. One end portion of the vertical rotation shaft 11 extends to the inside of the recess portion 21. The scanning mirror 15 is fixed to the one end portion, and the scanning mirror 15 is accommodated in the recess portion 21. Further, the vertical angle encoder 14 is provided at the other end portion of the vertical rotation shaft 11.

The vertical rotation motor 13 is provided on the vertical rotation shaft 11, and the vertical rotation motor 13 is controlled by the arithmetic control module 17. The arithmetic control module 17 rotates the vertical rotation shaft 11 by the vertical rotation motor 13. The scanning mirror 15 is rotated around the axis 11a.

A rotation angle of the scanning mirror 15 is detected by the vertical angle encoder 14, and a detection signal is input to the arithmetic control module 17. The arithmetic control module 17 calculates the vertical angle data of the scanning mirror 15 based on the detection signal, and performs the feedback control of the vertical rotation motor 13 based on the vertical angle data.

Further, the horizontal angle data and the vertical angle data calculated by the arithmetic control module 17 and the measurement results are stored in the storage module 18. As the storage module 18, various types of storage devices are used. These storage devices include: a HDD as a magnetic storage device, a CD or DVD as an optical storage device, a memory card and a USB memory as a semiconductor storage device are used. The storage module 18 may be attachable or detachable the frame unit 5. Alternatively, the storage module 18 may enable transmitting the data to an external storage device or an external data processing device via a non-illustrated communicating means.

In the storage module 18 are stored the various types of programs are stored. These programs include: a sequence program for controlling the distance measuring operation, a calculation program for calculating a distance by the distance measuring operation, a calculation program for calculating an angle based on the horizontal angle data and the vertical angle data, a program for calculating the three-dimensional coordinates of a desired measuring point based on a distance and an angle and other programs. Further, when the various types of programs stored in the storage module 18 are executed by the arithmetic control module 17, the various types of processing are performed.

The operation panel 16 is, for instance, a touch panel, and the operation panel 16 serves as both an operation module which performs changing the distance measurement instructions or the measurement conditions such as a measuring point interval or the like and a display module which displays a distance measurement result and the like.

Next, a description will be given on the distance measuring module 19.

The distance measuring light which is the pulsed light is projected from the light emitter 22. The distance measuring light is projected via a light projecting optical system 23 and a reflecting prism 24. An optical axis of the distance measuring light projected from the reflecting prism 24 coincides with the axis 11a, and the distance measuring light is deflected at a right angle by the scanning mirror 15. When the scanning mirror 15 rotates around the axis 11a, the distance measuring light becomes orthogonal to the axis 11a and is rotated (scanned) within a plane including the axis 6a.

The distance measuring light reflected by an object (hereinafter referred to as a reflected distance measuring light) strikes upon the scanning mirror 15, and the reflected distance measuring light is deflected by the scanning mirror 15. The reflected distance measuring light deflected by the scanning mirror 15 is received by a photodetector 26 through a light receiving optical system 25.

The distance measuring module 19 performs the distance measurement in accordance with each pulse of the distance measuring light based on a time lag between a light emitting timing of the light emitter 22 and a light receiving timing of the photodetector 26 (that is, a round-trip time of the pulsed light) and a light velocity (Time Of Flight). The light emitter 22 can change the light emission timing, that is, a pulse interval.

It is to be noted that an internal reference light optical system (to be described later) is provided to the distance measuring module 19. By performing the distance measurement based on a time lag in light receiving timing between the internal reference light (to be described later) received from the internal reference light optical system and the reflected distance measuring light, the distance measuring module 19 enables the further accurate distance measurement.

The frame unit 5 and the scanning mirror 15 rotates at the constant speeds, respectively. The cooperation of the rotation of the scanning mirror 15 in the vertical direction and the rotation of the frame unit 5 in the horizontal direction makes a two-dimensional scan using the distance measuring light. Further, since the distance measurement data (a slope distance) is acquired by the distance measurement for each pulsed light, by detecting a vertical angle and a horizontal angle with the use of the vertical angle encoder 14 and the horizontal angle encoder 9 in accordance with each pulse, the arithmetic control module 17 enables acquiring the vertical angle data and the horizontal angle data. The three-dimensional point cloud data corresponding to the object can be acquired based on the vertical angle data, the horizontal angle data and the distance measurement data.

Figure 2:
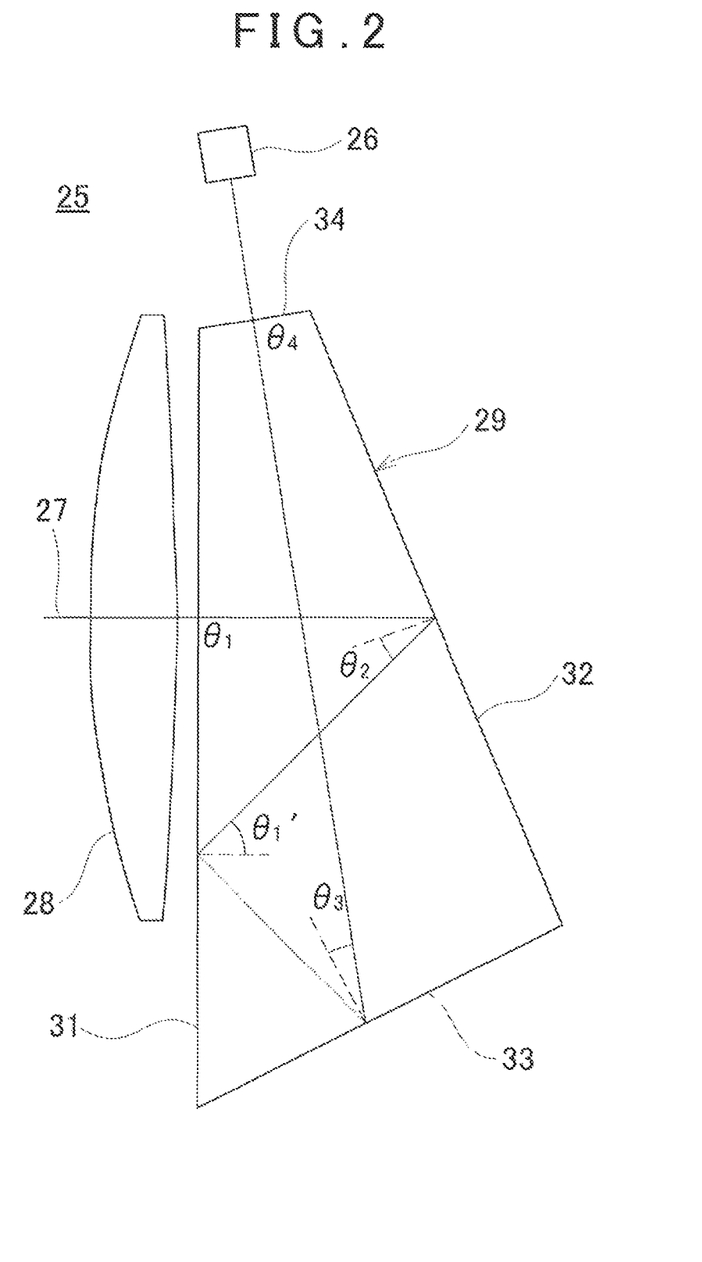
FIG. 2 is a block diagram showing a light receiving optical system of the surveying instrument according to the first embodiment of the present invention.

Next, a description will be given on the detail of the light receiving optical system 25 by referring to FIG. 2. It is to be noted that, in FIG. 2, a chief ray (an optical axis) 27 in the reflected distance measuring light (the incoming light) alone is shown.

The light receiving optical system 25 has a light receiving lens 28 and a light receiving prism 29. The light receiving lens 28 is a lens having a predetermined NA (Numerical Aperture). As the light receiving lens 28, for instance, a lens whose NA=0.05 to 0.55 is used.

The light receiving prism 29 is a quadrangular prism having a predetermined refractive index. The light receiving prism 29 has a first plane 31 which the chief ray 27 transmitted through the light receiving lens 28 enters, a second plane 32 on which the chief ray 27 transmitted through the surface of the first plane 31 is reflected, a third plane 33 upon which the chief ray 27 reflected on the second plane 32 and the first plane 31 enters, and a fourth plane 34 through which the chief ray 27 reflected on the third plane 33 is transmitted. The chief ray 27 transmitted through the fourth plane 34 enters the photodetector 26.

The surface (an incidence surface) of the first plane 31 is a full transmission plane formed an antireflection film on the surface, and a chief ray incidence angle with respect to the first plane 31 is set so that the internal reflection occurs on the first plane 31. Further, an optical axis of the chief ray 27 is orthogonal with respect to the first plane 31, and a chief ray incidence angle "θ1" with respect to the surface of the first plane 31 is 0°.

The second plane 32 has a reflective film formed on the surface and is configured to fully reflect the chief ray 27 transmitted through the first plane 31. Further, the second plane 32 tilts with respect to the chief ray 27 so that the chief ray 27 strikes at a predetermined chief ray incidence angle "θ2", for instance, in the range of 15° to 30°.

It is to be noted that the chief ray 27 reflected on the second plane 32 strikes upon the first plane 31 at a chief ray incidence angle "θ1'", and the chief ray 27 is internally reflected. At this time, the chief ray incidence angle "θ1'=2θ2" is achieved.

At this time, "θ1'" is set with respect to the first plane 31 such a manner that "θ1'" becomes larger than a critical angle, and the chief ray 27 is fully reflected on the first plane 31. Further, the third plane 33 tilts with respect to the chief ray 27 so that the chief ray 27 strikes at a predetermined chief ray incidence angle "θ3", for instance, in the range of 10° to 30°.

An antireflective film is provided on the surface of the fourth plane 34, and the fourth plane 37 is a full transmission plane. Further, the fourth plane 34 is orthogonal with respect, to the optical axis of the chief ray 27 to be transmitted, and a chief ray incidence angle "θ4" with respect to the fourth plane 34 is 0°.

Here, to configure the chief ray incidence angle with respect to each plane of the light receiving prism 29 to be an angle which does not produce the vignetting and the like, a refractive index of the light receiving prism 29 and the NA of the light receiving lens 28 must fall within a predetermined range. A table in FIG. 3 shows a specific example of each relationship among the refractive index of the light receiving prism 29, the NA of the light receiving lens 28 and the chief ray incidence angle with respect to the light receiving prism 29.

Figure 3:
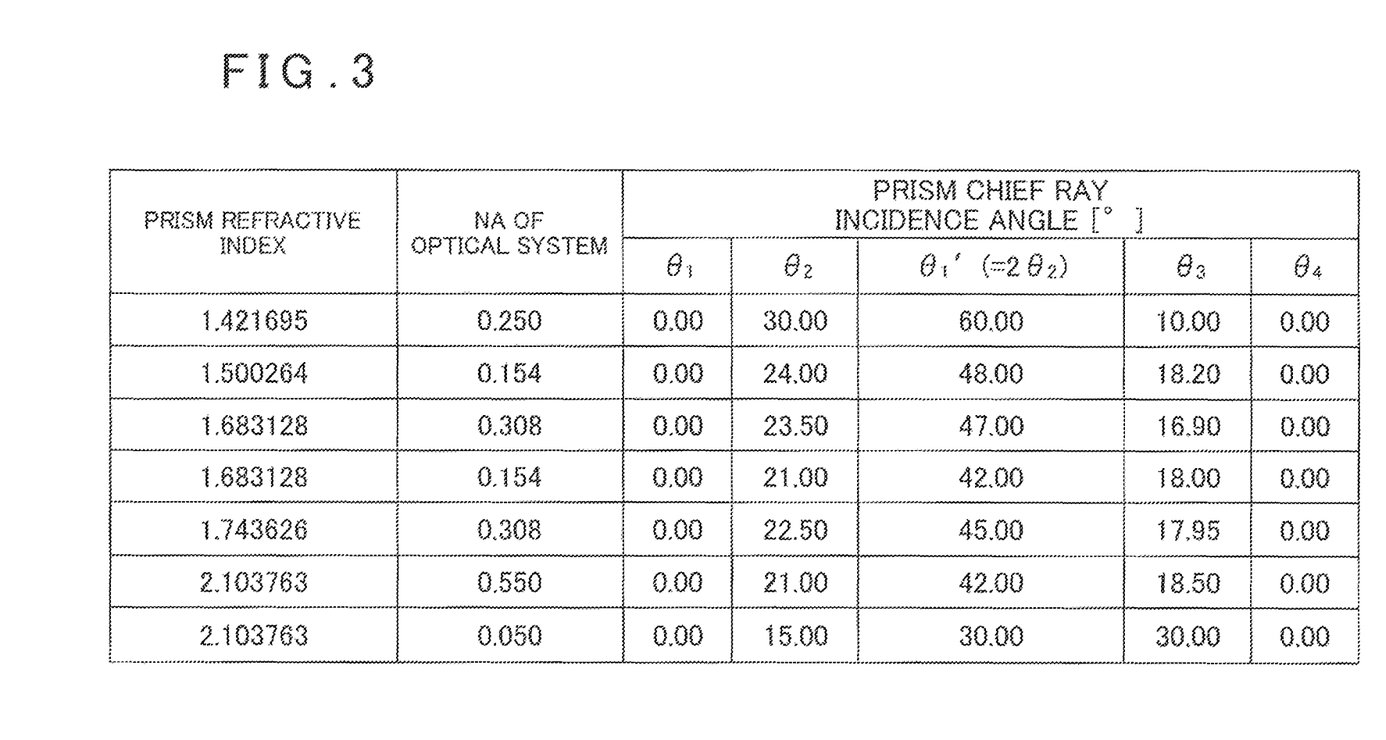
FIG. 3 is a table showing a specific example of each relationship between a refractive index of a light receiving prism, NA (Numerical Aperture) of a light receiving lens and a chief ray incidence angle with respect to each plane of the light receiving prism according to the first embodiment.

As shown in FIG. 3, in the first embodiment, the refractive index of the light receiving prism 29 falls within the range of 1.42 to 2.11, and the NA of the light receiving lens 28 falls within the range of 0.05 to 0.55. Thereby, "θ2" falls within the range of 15° to 30° and "θ3" falls within the range of 10° to 30°, and hence a sufficient light income can be assured, and the vignetting and the like produced in the reflection can be suppressed.

Figure 4A:
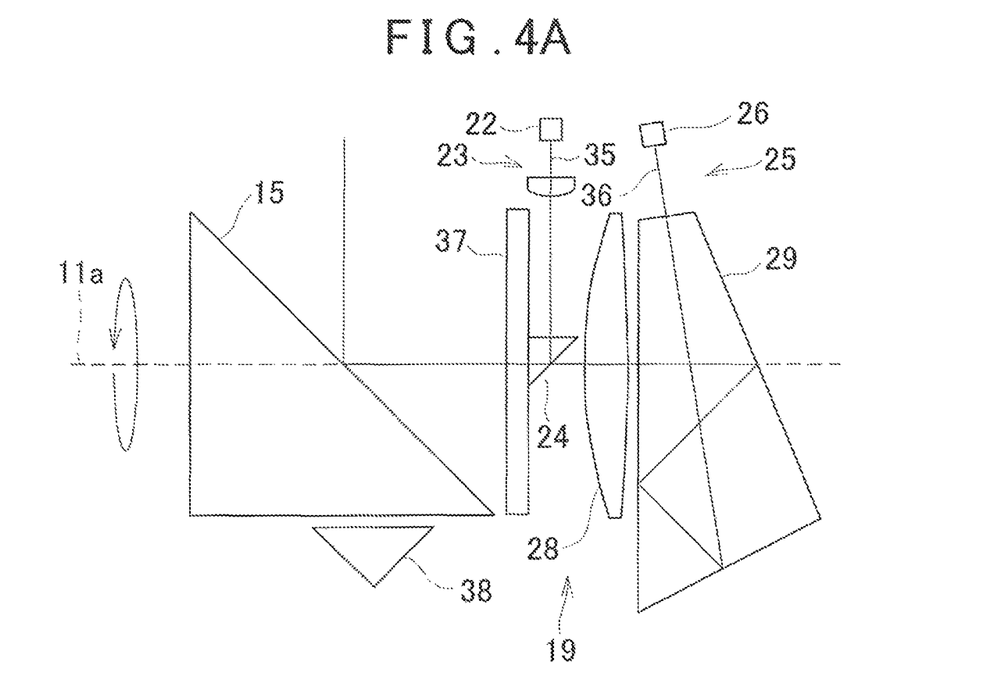
FIG. 4A and FIG. 4B are the block diagrams each showing an example of a distance measuring module to which the light receiving optical system according to the first embodiment is applied.
Figure 4B:
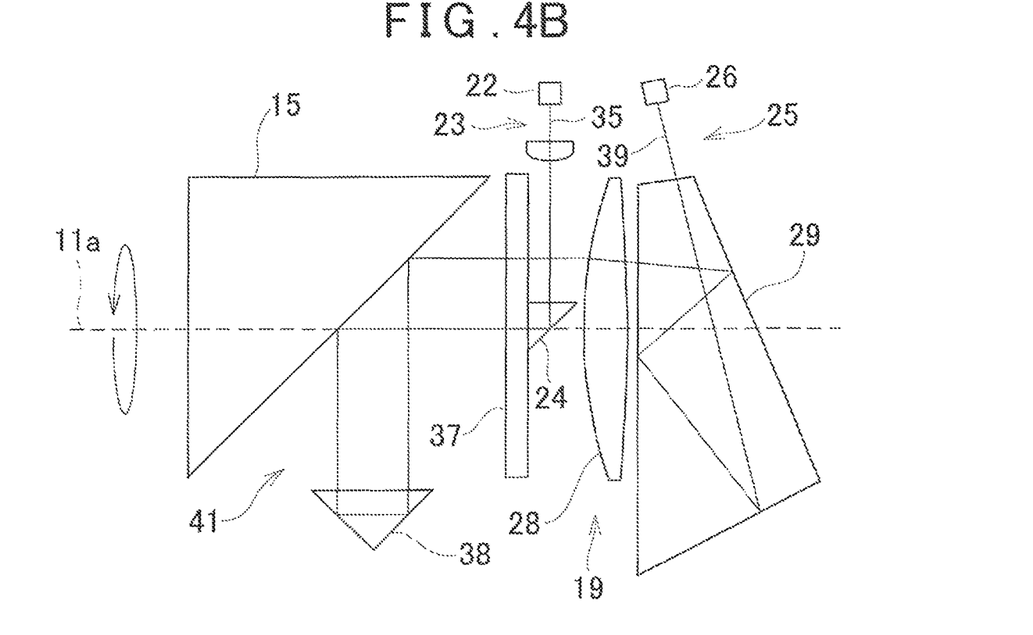

Each of FIG. 4A and FIG. 4B shows an example of the distance measuring module 19 to which the light receiving optical system 25 according to the first embodiment has been adapted and a peripheral portion of the distance measuring module 19.

In FIG. 4A and FIG. 4B, a reference numeral 37 denotes a window portion provided in the frame unit 5, and the window portion 37 is formed by a transparent material. The distance measuring module 19 projects the distance measuring light 35 from the window portion 37, and the reflected distance measuring light 36 is received through the window portion 37. The reflecting prism 24 is attached to the window portion 37. It is to be noted that the reflecting prism 24 may be attached to the light receiving lens 28.

Further, a reference prism 38 having the retroreflective properties is provided below the scanning mirror 15. In a process of performing the rotary irradiation of the distance measuring light 35 via the scanning mirror 15, the distance measuring light 35 enters the reference prism 38. The distance measuring light 35 retroreflected by the reference prism 38 enters the light receiving optical system 25 via the scanning mirror 15, and received by the photodetector 26.

Here, an optical path length from the light emitter 22 to the reference prism 38 and an optical path length from the reference prism 38 to the photodetector 26 are known. Therefore, the distance measuring light 35 reflected by the reference prism 38 can be used as the internal reference light 39. The scanning mirror 15 and the reference prism 38 constitute an internal reference light optical system 41.

The distance measuring light 35 emitted from the light emitter 22 is irradiated with respect to an object via the light projecting optical system 23 and the scanning mirror 15. The reflected distance measuring light 36 which has been reflected by the object and has entered the light receiving optical system 25 via the scanning mirror 15 is refracted in a process of the transmission through the light receiving lens 28 and the first plane 31. Further, the reflected distance measuring light 36 is sequentially reflected on the second plane 32, the first plane 31 and the third plane 33 in the light receiving prism 29, transmitted through the fourth plane 34, and projected.

As described above, in the first embodiment, the light receiving prism 29 having the reflection planes therein is used, the reflected distance measuring light 36 is internally reflected in the light receiving prism 29 three times, and an optical path of the reflected distance measuring light 36 is bent, and an optical path length corresponding to a focal distance of the light receiving lens 28 is assured.

Therefore, since a length of the distance measuring module 19 in the optical axis direction can be shortened, the miniaturization of the optical system of the distance measuring module 19 can be achieved, and the miniaturization of the entire surveying instrument can be also achieved.

Further, in the first embodiment, as an optical member to bend the optical path of the reflected distance measuring light 36, the prism is used rather than a planar mirror. Therefore, a deviation of the optical axis (a deflection angle error) based on a temperature change with respect to the surveying instrument main body 3 is suppressed, and a measurement accuracy can be improved.

Figure 5:
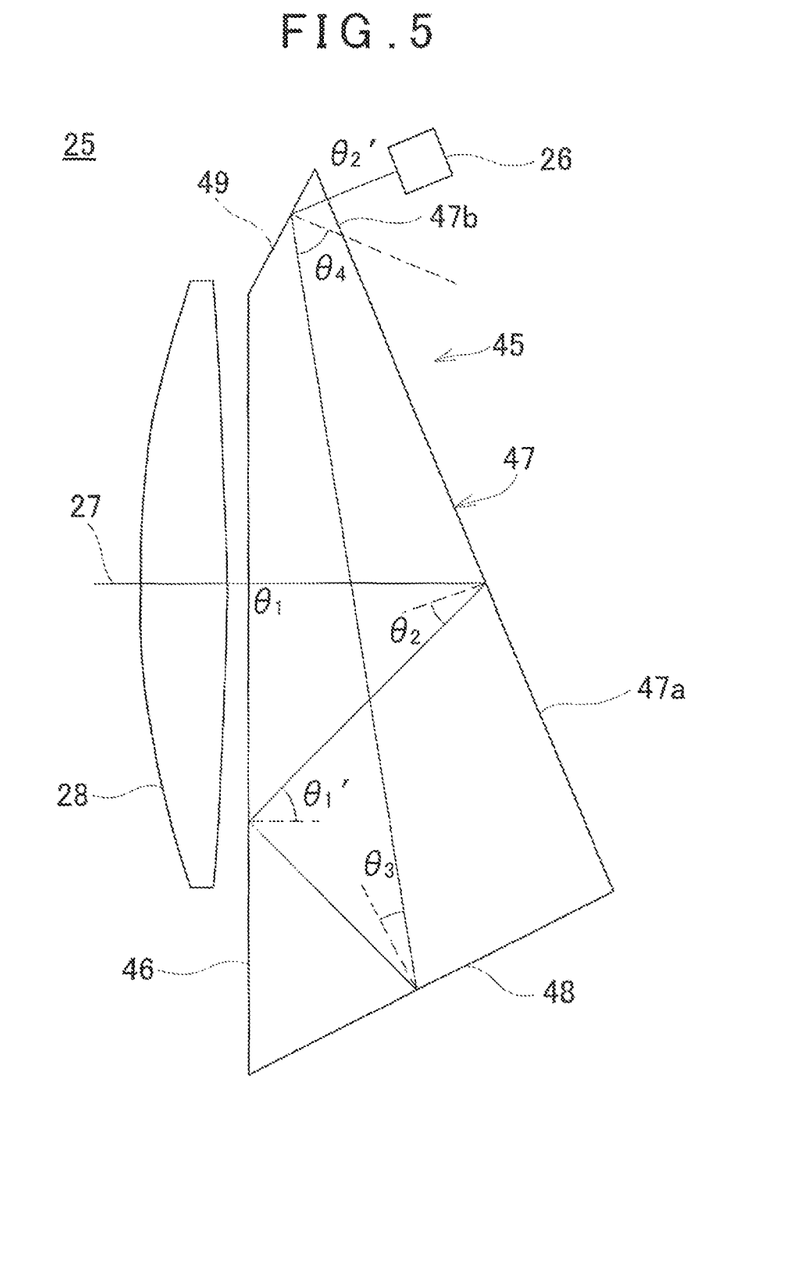
FIG. 5 is a block diagram showing a light receiving optical system of a surveying instrument according to a second embodiment of the present invention.

Next, a description will be given on a second embodiment of the present invention by referring to FIG. 5. It is to be noted that, in FIG. 5, the same components as shown in FIG. 2 are referred by the same symbols, and a detailed description thereof will be omitted. Further, FIG. 5 shows a chief ray 27 alone in the reflected distance measuring light 36 (see FIG. 4).

A light receiving prism 45 in the second embodiment is a quadrangular prism having a refractive index equal to the light receiving prism 29 in the first embodiment. The light receiving prism 45 has a first plane 46 which the chief ray 27 transmitted through a light receiving lens 28 enters, a reflecting surface 47a of a second plane 47 upon which the chief ray 27 transmitted through the surface of the first plane 46 enters, a third plane 48 upon which the chief ray 27 reflected on the reflection plane 47a and the first plane 46 enters, a fourth plane 49 upon which the chief ray 27 reflected on the third plane 48 enters, and a transmission plane 47b of the second plane 47 which the chief ray 27 reflected on the fourth plane 49 enters. The chief ray 27 transmitted through the transmission plane 47b enters a photodetector 26.

It is to be noted that, as described above, the second plane 47 is constituted of the reflection plane 47a which reflects the chief ray 27 and the transmission plane 47b which fully transmits the chief ray 27. The reflection plane 47a is placed on a transmission optical path of the first plane 46, and the transmission plane 47b is placed on a reflection optical path of the fourth plane 49.

The first plane 46 and the third plane 48 have the same configurations as the first plane 31 and the third plane 33 in the first embodiment, respectively. Further, the reflection plane 47a has the same configuration as the second plane 32 in the first embodiment.

That is, a chief ray incidence angle "θ1" with respect to the first plane 46 is 0°, a chief ray incidence angle "θ2" with respect to the reflection plane 47a is 15° to 30°, and a chief ray incidence angle "θ3" with respect to the third plane 48 is 10° to 30°. Further, a chief ray incidence angle "θ1'" of the chief ray 27 reflected on the reflection plane 47a with respect to the first plane 46 is "2θ2".

The fourth plane 49 has a reflective film provided on the surface and is configured to fully reflect the chief ray 27 reflected on the third plane 48. Further, the fourth plane 49 tilts with respect to the chief ray 27 so that a chief ray incidence angle θ4=1.5θ2+θ3 is achieved.

An antireflective film is provided on the transmission plane 47b, and the transmission plane 47b is a fully transmission plane of the chief ray. Further, the transmission plane 47b is orthogonal with respect to the chief ray 27, and a chief ray incidence angle "θ2'" with respect to the transmission plane 47b is 0°.

Figure 6:
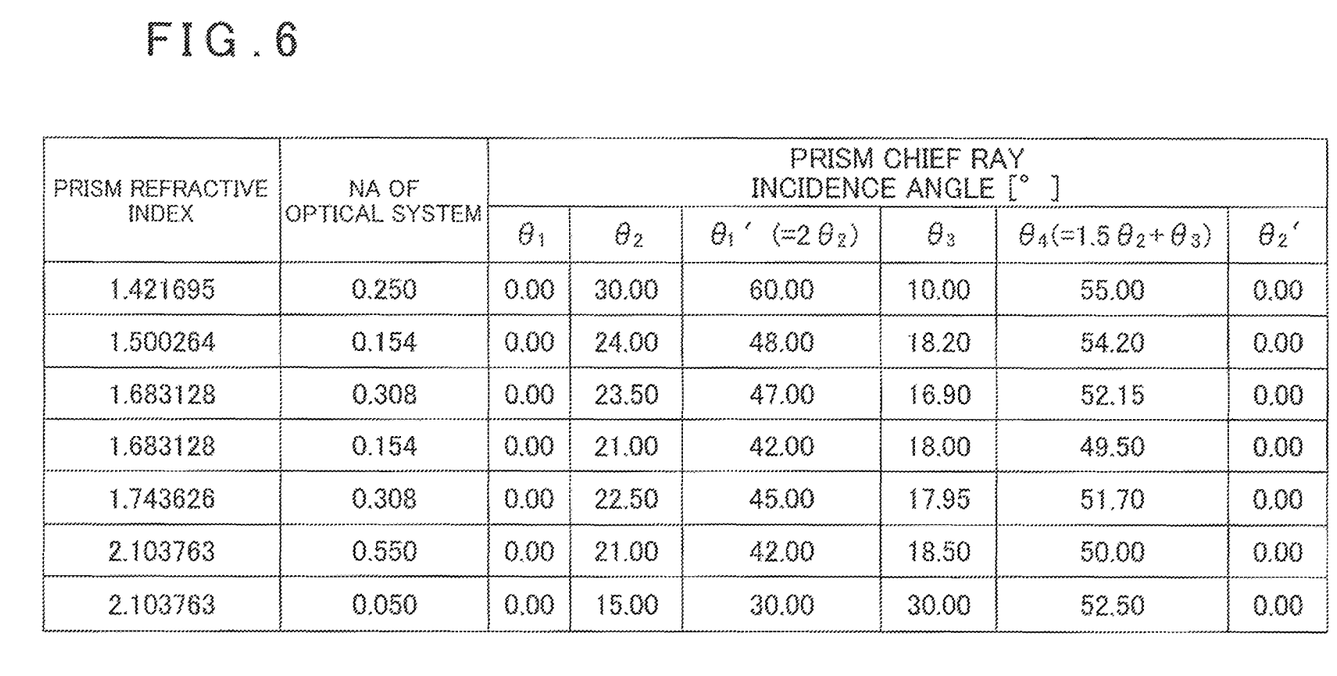
FIG. 6 is a table showing a specific example of each relationship between a refractive index of a light receiving prism, NA (Numerical Aperture) of a light receiving lens and a chief ray incident angle with respect to each plane of the light receiving prism according to a second embodiment.

A table in FIG. 6 shows a specific example of each relationship among a refractive index of the light receiving prism 45, the NA of the light receiving lens 28, and a chief ray incidence angle with respect to the light receiving prism 45.

As shown in FIG. 6, in the second embodiment, likewise, the refractive index of the light receiving prism 45 is set to fall within the range of 1.42 to 2.11 and the NA of the light receiving lens 28 is set to fall within the range of 0.05 to 0.55. Thereby, since "θ2" is in the range of 15° to 30° and "θ3" is in the range of 10° to 30°, a sufficient light income can be assured, and the vignetting and the like produced in the reflection can be suppressed.

Further, in the second embodiment, the reflected distance measuring light 36 is internally reflected in the light receiving prism 45 four times, and an optical path of the reflected distance measuring light 36 is bent, and an optical path length corresponding to a focal distance of the light receiving lens 28 is assured.

Therefore, since a length of the distance measuring module 19 (see FIG. 1) in the optical axis direction can be shortened, the miniaturization of the optical system of the distance measuring module 19 can be achieved, and the miniaturization of the entire surveying instrument can be also achieved.

Further, as an optical member to bend the optical path of the reflected distance measuring light 36, since the prism is used rather than a planar mirror, a deviation of the optical axis (a deflection angle error) based on a temperature change is suppressed, and a measurement accuracy can be improved.

Figure 7A:
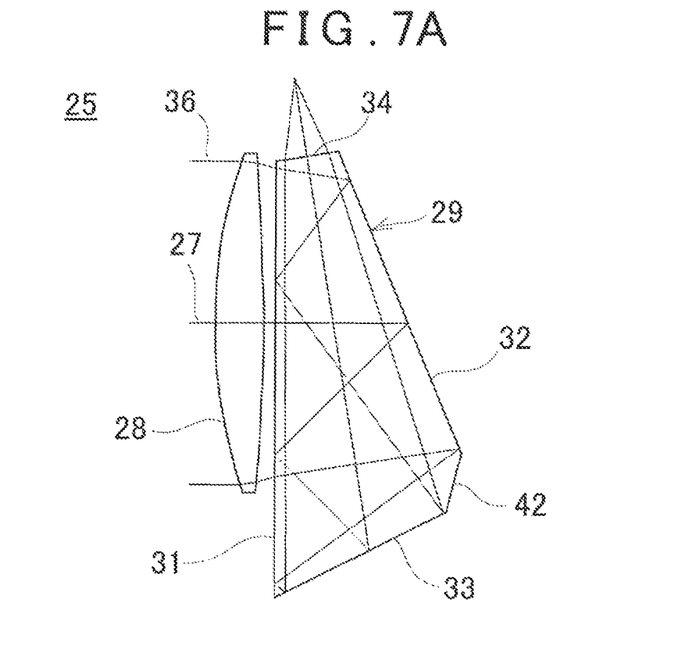
FIG. 7A is a block diagram showing a modification of the light receiving optical system according to the first embodiment of the present invention.

FIG. 7A shows a modification of the first embodiment. In the modification, the structure chamfering processing is performed to a portion deviating from an optical path of the reflected distance measuring light 36, that is, a ridge portion formed by the second plane 32 and the third plane 33, and a chamfered portion 42 is formed.

When the chamfered portion 42 is formed at the ridge portion between the second plane 32 and the third plane 33, the length of the distance measuring module 19 in the optical axis direction can be further shortened, and the optical system of the distance measuring module 19 can be further miniaturized.

Further, as described above, a portion where the chamfered portion 42 is formed is a portion deviating from the optical path of the reflected distance measuring light 36. Therefore, even if the chamfered portion 42 is formed, an effect of the light receiving prism 29 is not affected.

Figure 7B:
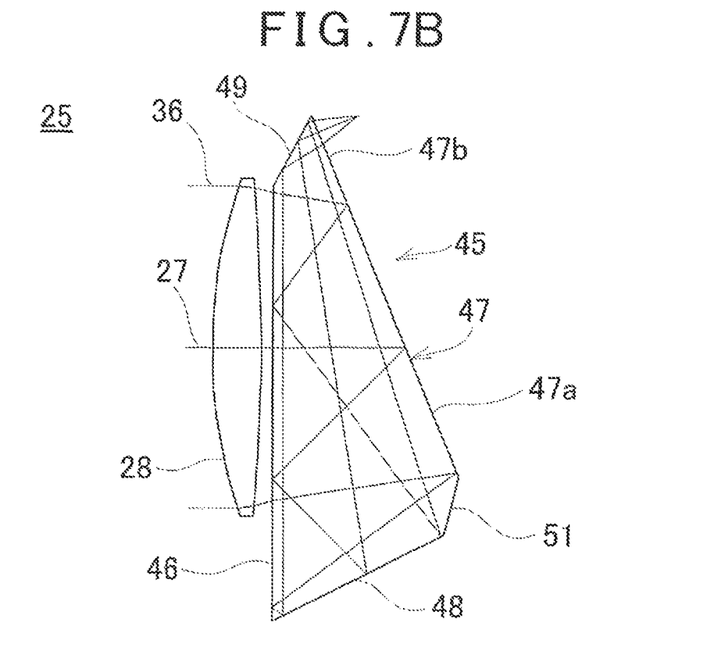
FIG. 7B is a block diagram showing a modification of the light receiving optical system according to the second embodiment of the present invention.

FIG. 7B shows a modification of the second embodiment. In the modification, same to the first embodiment, the structure chamfering processing is performed to a ridge portion formed by the second plane 47 (the reflection plane 47a) and the third plane 48, and a chamfered portion 51 is formed.

By forming the chamfered portion 51, the length of the distance measuring module 19 in the optical axis direction can be further shortened, and the optical system of the distance measuring module 19 can be further miniaturized without affecting an effect of the light receiving prism 45.

It is to be noted that, in FIG. 8A, FIG. 8B, FIG. 8C, and FIG. 8D, a length "L0" of the light receiving optical system 25 in the optical axis direction in the modification of the first embodiment is compared with a length of the light receiving optical system in the optical axis direction in any other configuration.

Figure 8A:
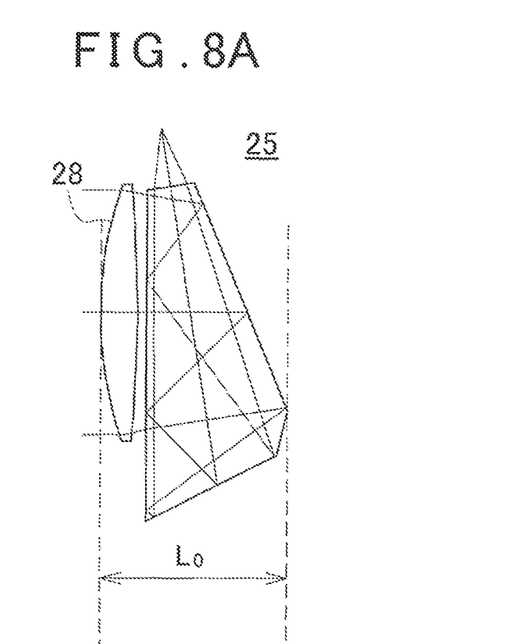
FIG. 8A, FIG. 8B, FIG. 8C, and FIG. 8D are the explanatory drawings each showing a comparison between a length in an optical axis direction in the modification of the light receiving optical system according to the first embodiment of the present invention and a length in the optical axis direction in a different configuration.
Figure 8B:
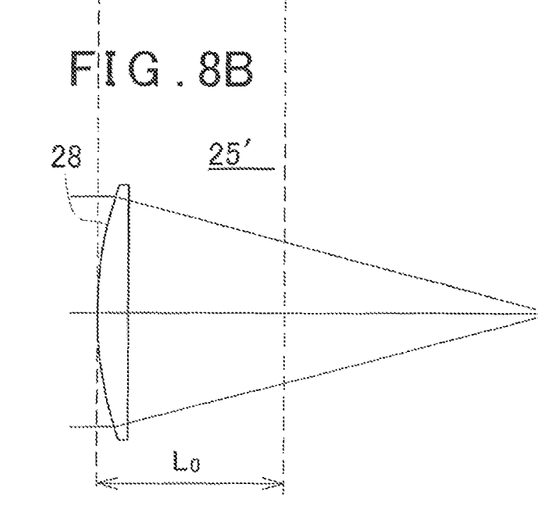
Figure 8C:
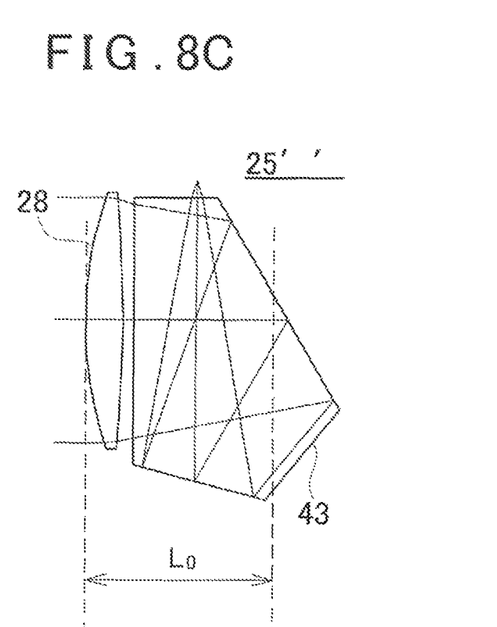

FIG. 8A shows the light receiving optical system 25 in the modification of the first embodiment. Further, FIG. 8B shows a light receiving optical system 25' in a case where the reflected distance measuring light 36 is not bent. Further, FIG. 8C shows a light receiving optical system 25" in a case where a pentaprism 43 is used as an optical member which bends the reflected distance measuring light 36. Further, FIG. 8D shows a light receiving optical system. 25'" in a case where a mirror 44 is used as the optical member which bends the reflected distance measuring light 36.

Figure 8D:
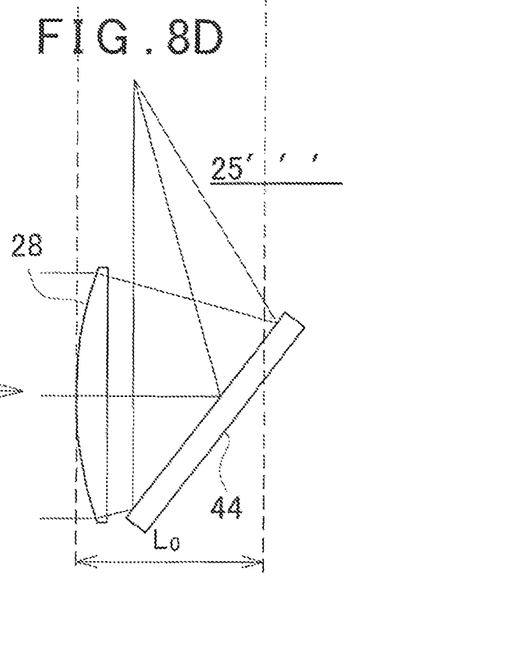

As shown in FIG. 8A, FIG. 8B, FIG. BC, and FIG. 8D, the length "L0" of the light receiving optical system 25 in the optical axis direction is shorter than the length in the optical axis direction in each of the FIG. 8A, FIG. 8B, FIG. 8C and FIG. 8D. In particular, the length of the light receiving optical system 25 in the optical axis direction can be shortened by 30% as compared with the light receiving optical system 25" using the pentaprism 43 in FIG. 8C.

It is to be noted that, in the first embodiment and the second embodiment, to shorten the optical path length of the light receiving optical system 25 which is a light collecting optical system, the light receiving prism 29 or 45 is provided on the optical path of the reflected distance measuring light 36 collected by the light receiving lens 28. On the other hand, the light receiving prism 29 or 45 may be provided in the light projecting optical system 23 (see FIG. 1) which is a diverging optical system, and the distance measuring light 35 (see FIG. 4) emitted from the light emitter 22 (see FIG. 1) may be deflected by the light receiving prism 29 or 45 so that the distance measuring light 35 becomes a substantial parallel light flux. Alternatively, the light receiving prism 29 or 45 may be provided is both the light projecting optical system 23 and the light receiving optical system 25.

Further, in the first embodiment and the second embodiment, the length of the distance measuring module 19 in the optical axis direction is shortened by the single light receiving prism 29 or 45. On the other hand, a plurality of prisms or mirrors may be combined so that the reduction of the length of the distance measuring module 19 in the optical axis direction can be achieved.

The invention claimed is:

1. A surveying instrument comprising: a distance measuring module for irradiating an object with the distance measuring light and measuring a distance to said object based on the reflected distance measuring light from said object, wherein said distance measuring module includes a light projecting optical system configured to project said distance measuring light and a light receiving optical system configured to receive said reflected distance measuring light, said light receiving optical system includes a prism having a quadrangular shape and a photodetector, said prism comprises a first plane, a second plane, a third plane and a fourth plane, configured to enter said reflected distance measuring light in said first plane, sequentially internally reflect on said second plane, said first plane, and said third plane, transmit through said fourth plane, and project, and said reflected distance measuring light projected from said prism is configured to be received by said photodetector.

2. The surveying instrument according to claim 1, wherein said prism is configured in such a manner that a chief ray incidence angle "θ1" of said reflected distance measuring light with respect to said first plane and a chief ray incidence angle "θ4" of said reflected distance measuring light with respect to said fourth plane become 0°, respectively.

3. The surveying instrument according to claim 2, wherein said prism is configured in such a manner that a chief ray incidence angle "θ2" of said reflected distance measuring light with respect to said second plane falls within the range of 15° to 30°, a chief ray incidence angle "θ1'" of said reflected distance measuring light reflected on said second plane with respect to said first plane becomes "2θ2", and a chief ray incidence angle θ3 of said reflected distance measuring light with respect to said third plane falls within the range of 10° to 30°.

4. The surveying instrument according to claim 3, wherein said light receiving optical system includes a light receiving lens for collecting said reflected distance measuring light, and an NA (Numerical Aperture) of said light receiving lens falls within the range of 0.05 to 0.55.

5. The surveying instrument according to claim 2, wherein said light receiving optical system includes a light receiving lens for collecting said reflected distance measuring light, and an NA (Numerical Aperture) of said light receiving lens falls within the range of 0.05 to 0.55.

6. The surveying instrument according to claim 1, wherein said light receiving optical system includes a light receiving lens for collecting said reflected distance measuring light, and an NA (Numerical Aperture) of said light receiving lens falls within the range of 0.05 to 0.55.

7. The surveying instrument according to claim 1, wherein a structure chamfering processing is performed with respect to a ridge portion formed by said second plane and said third plane.

8. A surveying instrument comprising: a distance measuring module for irradiating an object with the distance measuring light and measuring a distance to said object based on the reflected distance measuring light from said object, wherein said distance measuring module includes a light projecting optical system configured to project said distance measuring light and a light receiving optical system configured to receive said reflected distance measuring light, said light receiving optical system includes a prism having a quadrangular shape and a photodetector, said prism comprises a first plane, a second plane, a third plane, and a fourth plane, said second plane is constituted of a reflection plane for reflecting said reflected distance measuring light and a transmission plane for transmitting through said reflected distance measuring light, said prism configured to enter said reflected distance measuring light in said first plane, sequentially internally reflect on said reflection plane, said first plane, said third plane, and said fourth plane, transmit through said transmission plane, and project, and said reflected distance measuring light projected from said prism is configured to be received by said photodetector.

9. The surveying instrument according to claim 8, wherein said prism is configured in such a manner that a chief ray incidence angle "θ1" of said reflected distance measuring light with respect to said first plane and a chief ray incidence angle "θ2'" of said reflected distance measuring light with respect to said transmission plane become 0°, respectively.

10. The surveying instrument according to claim 9, wherein said prism is configured in such a manner that a chief ray incidence angle "θ2" of said reflected distance measuring light with respect to said second plane falls within the range of 15° to 30°, a chief ray incidence angle "θ1'" of said reflected distance measuring light reflected on said second plane with respect to said first plane becomes "2θ2", a chief ray incidence angle "θ3" of said reflected distance measuring light with respect to said third plane falls within the range of 10° to 30°, and a chief ray incidence angle "θ4" of said reflected distance measuring light with respect to said fourth plane becomes "1.5θ2+θ3".

11. The surveying instrument according to claim 9, wherein said light receiving optical system includes a light receiving lens for collecting said reflected distance measuring light, and an NA (Numerical Aperture) of said light receiving lens falls within the range of 0.05 to 0.55.

12. The surveying instrument according to claim 8, wherein said light receiving optical system includes a light receiving lens for collecting said reflected distance measuring light, and an NA (Numerical Aperture) of said light receiving lens falls within the range of 0.05 to 0.55.

13. The surveying instrument according to claim 8, wherein a structure chamfering processing is performed with respect to a ridge portion formed by said second plane and said third plane.

* * * * *